Patented Nov. 9, 1943

2,334,100

UNITED STATES PATENT OFFICE 2,334,100

HYDROGENATION OF KETONES

Vladimir N. Ipatieff and Vladimir Haensel, Chicago, Ill., assignors to Universal Oil Products Company, Chicago, Ill., a corporation of Delaware No Drawing. Application October 19, 1940, Serial No. 361,894

7 Claims. (Cl. 260—668)

This invention relates to the use of particular catalytic materials in reactions involving hydrogenation of ketones.

In one specific embodiment the present invention comprises a process for hydrogenating alkyl aryl ketones to aromatic alcohols and alkylated aromatic hydrocarbons which comprises subjecting said ketones under hydrogenating conditions of temperature and pressure to contact with a composite comprising essentially copper, zinc, and alumina.

A composite of these materials, which is utilized as a catalyst for hydrogenation reactions in accordance with the present invention, may be made by the general process of precipitating the carbonates of zinc and copper from the metallic salts, particularly the nitrates, by the addition of soluble carbonates, particularly ammonium carbonate, in amounts slightly in excess of that required for complete precipitation. The precipitation may be made at ordinary or elevated temperatures up to approximately 100° C. The total suspended material including the precipitates of zinc carbonate and copper carbonate on alumina particles is then filtered, carefully washed with water to remove soluble salts, dried at temperatures of from approximately 180° to about 200° C. for from about 10 to 20 hours and then pelleted or otherwise formed into particles of definite shape and size, usually with the addition of a small amount of a lubricant, such as, for example, a hydrogenated vegetable or animal oil; the particles are then subjected to the action of dry hydrogen at temperatures up to about 600° C. which results in the removal of the lubricating material and reduction of the carbonates, first to the oxides and then to the metals. In place of hydrogen, dry carbon monoxide or a dry mixture of hydrogen and carbon monoxide may be used for the reduction. Alternatively, the pellets may be treated first with dry air or other gases to remove the lubricant before reduction.

The composite catalyst is also prepared by coprecipitating copper carbonate, zinc carbonate, and alumina or the precipitation procedure may be varied so that zinc carbonate is first precipitated on alumina followed by precipitation of the basic copper carbonate on the mixture. The resulting precipitated mixtures are dried, pelleted, and reduced as hereinabove set forth.

Proportions of zinc, copper, and alumina in composites prepared and reduced by the above general methods, are varied considerably to produce catalysts of different activities in hydrogenation reactions in which they are used. Good catalysts are prepared, for example, consisting of 25 parts by weight of zinc, 25 parts by weight of copper, and 50 parts by weight of alumina, while others consist of approximately equal parts by weight of zinc, copper, and alumina. Catalysts still exhibit high activity when the zinc concentration is approximately 7% and the copper concentration is approximately 3.5% by weight. Later examples will show the type of results obtainable by the use of these catalysts.

Particles of copper-zinc-alumina catalysts prepared as indicated and frequently containing incompletely reduced zinc oxide and copper oxide, are utilizable as fillers in suitable heated reactors through which the ketone mixed with hydrogen is passed in the presence or absence of a suitable solvent under a pressure between about 50 and about 200 atmospheres at a temperature within the approximate limits of 50° and 250° C. The catalyst temperature, ketone charging rate, and ratio of hydrogen to ketone employed are chosen to give the optimum degree of conversion to alcohol or to alkylated aromatic hydrocarbon, as desired, with a relative low order of accompanying decomposition. When desired, less severe conditions of hydrogenation may be used in order to obtain the corresponding alcohol which apparently is an intermediate product in the hydrogenation of a ketone to an aromatic hydrocarbon.

Also hydrogenation of aromatic and aliphatic ketones is effected in the presence of powdered catalysts mixed therewith and passed through a suitable reactor operated under substantially the conditions indicated. The reaction products formed in the presence of either a fixed catalyst or powdered catalyst are separated from the catalytic material and fractionated to separate desired products from unconverted charging material and decomposition products. Said unconverted charging material is recycled to further contact with the hydrogenating catalyst to form an additional quantity of desired hydrogenation product.

Batch type hydrogenation of an alkyl aryl ketone may be carried out by subjecting said ketone and a copper-zinc-alumina catalyst to contact in an autoclave at a temperature of from about 50 to about 250° C. under a pressure of from about 50 to about 200 atmospheres. After the hydrogenating reaction has proceeded for a sufficient time to convert the alkyl aryl ketone into an aromatic alcohol and/or to an alkylated aromatic hydrocarbon, the hydrogenation products are separated from the catalyst. Fractionation of the resulting reaction products separates desired products from unconverted ketone which is blended with an additional quantity of the charged ketone and returned to further hydrogenating treatment.

While the process of this invention is particularly advantageous for producing aromatic hydrocarbons with paraffinic side chains and aromatic alcohols from alkyl aryl ketones, the process is also applicable to the hydrogenation of aliphatic ketones and of other organic compounds. Thus the simple ketone, acetone, is readily converted by hydrogenation into isopropyl alcohol, and mesityl oxide into methyl isobutyl carbinol.

Hydrogenation catalysts prepared by precipitating carbonates of zinc and copper upon a refractory support such as alumina followed by filtering, washing, drying, and reducing according to the process of this invention, do not undergo excessive carbonization during use in hydrogenation reactions.

Catalysts prepared by the process outlined above are generally hard and resistant to breakage, have a relatively high activity due to the generally porous character of the metals formed by the reduction of the carbonates, and, owing to their high activity, they may be used over extended periods of time at relatively low temperatures without the formation of excessive carbon deposits which necessitate reactivation.

The following examples are given to indicate typical results obtainable in the operation of the process, although not with the intention of limiting the generally broad scope of the invention:

Example I

A catalyst was prepared by dissolving 228 parts by weight of zinc nitrate ($Zn(NO_3)_2 \cdot 6H_2O$) and 91.5 parts by weight of copper nitrate ($Cu(NO_3)_2 \cdot 3H_2O$) in 200 parts by weight of water. This solution was then diluted by adding it to 1600 parts by weight of water in which 130 parts by weight of finely divided alumina was maintained in suspension by rapid mechanical agitation. To the well-stirred suspension was added a solution consisting of 135 parts by weight of ammonium carbonate $$(NH_4)_2CO_3 \cdot H_2O$$

dissolved in 400 parts by weight of water. The total suspended material was filtered, washed until free from soluble salts, and dried at a temperature of from about 180° to about 200° C. for 12 hours. The powdered material was then mixed with 3 to 4% by weight of hydrogenated cocoanut oil, the latter used as a lubricant for the pelleting machine, and formed into pellets approximately ⅛ inch in diameter and ⅛ inch in length. The pellets were treated with dry hydrogen during heating from room temperature to about 510° C. which resulted in substantially complete reduction of both the zinc and copper salts to the respective metals.

10 parts by weight of the above described catalyst and 100 parts by weight of acetophenone were placed in an autoclave under an initial hydrogen pressure of 100 atmospheres and heated at 159° C. for 16 minutes. The resulting reaction products consisted of 63% of ethyl benzene and 37% of methyl phenyl carbinol.

Example II

A mixture of 100 parts by weight of acetophenone and 10 parts by weight of the catalyst described in Example I when subjected to contact for 3 hours at 107° C. under an initial hydrogen pressure of 100 atmospheres gave a 93% yield of methyl phenyl carbinol.

Example III 100 parts by weight of n-pentyl phenyl ketone and 10 parts by weight of the catalyst described in Example I were heated in a pressure autoclave under an initial hydrogen pressure of 100 atmospheres at a temperature which was increased gradually from 190° and 250° C. during a period of 7 hours. The resulting reaction products contained 74% by weight of normal hexyl benzene.

Example IV 100 parts by weight of laurophenone and 10 parts by weight of the hydrogenating catalyst described in Example I were placed in a rotating autoclave under an initial hydrogen pressure of 100 atmospheres and heated at a temperature between about 164° and about 176° C. during 6 hours. From the resulting hydrogenation product was obtained a yield of 84% by weight of n-dodecyl benzene.

The character of the process of the present invention and particularly its commercial value are evident from the preceding specification and limited numerical data, although neither section is intended to limit its generally broad scope.

We claim as our invention:

1. A process for hydrogenating an alkyl aryl ketone which comprises subjecting said alkyl aryl ketone and hydrogen at a temperature between about 50° and about 250° C. under a pressure between about 50 and about 200 atmospheres to contact with a composited material comprising essentially copper, zinc, and alumina.

2. A process for hydrogenating an acetophenone which comprises subjecting said acetophenone and hydrogen at a temperature between about 50° and about 250° C. under a pressure between about 50 and about 200 atmospheres to contact with a composited material comprising essentially copper, zinc and alumina.

3. A process for the treatment of alkyl aryl ketones to produce therefrom compounds of higher hydrogen content which comprises hydrogenating the ketone at hydrogenating conditions in the presence of a catalyst prepared by treating with a reducing gas a composite comprising copper oxide, zinc oxide and alumina.

4. The process of claim 3 further characterized in that the ketone comprises alkyl phenyl ketone.

5. A process for producing ethyl benzene which comprises hydrogenating acetophenone at hydrogenating conditions in the presence of a catalyst prepared by treating with a reducing gas a composite comprising copper oxide, zinc oxide and alumina.

6. A process for producing n-hexyl benzene which comprises hydrogenating n-pentyl phenyl ketone at hydrogenating conditions in the presence of a catalyst prepared by treating with a reducing gas a composite comprising copper oxide, zinc oxide and alumina.

7. A process for producing n-dodecyl benzene which comprises hydrogenating laurophenone at hydrogenating conditions in the presence of a catalyst prepared by treating with a reducing gas a composite comprising copper oxide, zinc oxide and alumina.

VLADIMIR N. IPATIEFF.
VLADIMIR HAENSEL.